United States Patent
Shurman et al.

(10) Patent No.: US 9,515,886 B2
(45) Date of Patent: Dec. 6, 2016

(54) RULE SET ORCHESTRATION PROCESSING METHOD AND APPARATUS, AND CLUSTER DATA SYSTEM

(71) Applicant: Huawei Technologies Co., Ltd., Shenzhen (CN)

(72) Inventors: Michael Shurman, Munich (DE); Xinghua Yang, Shenzhen (CN); Jun He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 298 days.

(21) Appl. No.: 14/107,740

(22) Filed: Dec. 16, 2013

(65) Prior Publication Data
US 2014/0244820 A1    Aug. 28, 2014

Related U.S. Application Data

(63) Continuation of application No. PCT/CN2013/080462, filed on Jul. 31, 2013.

(30) Foreign Application Priority Data

Feb. 27, 2013  (CN) .......................... 2013 1 0062082

(51) Int. Cl.
*H04L 12/24* (2006.01)
(52) U.S. Cl.
CPC ................................ *H04L 41/0893* (2013.01)
(58) Field of Classification Search
CPC ................ H04L 41/00; H04L 41/0893; H04L 29/06047; H04L 29/08162; H04L 29/08225; H04L 29/08522; H04L 29/0872; H04L 67/1002; H04L 67/1091; H04L 67/42
See application file for complete search history.

(56) References Cited

U.S. PATENT DOCUMENTS 8,601,542 B1 * 12/2013 Eatough ................. H04L 67/06
709/212
2003/0023711 A1   1/2003 Parmar et al.
(Continued)

FOREIGN PATENT DOCUMENTS

CN        1902877 A     1/2007
CN      102668493 A     9/2012
(Continued)

OTHER PUBLICATIONS

QuickSpecs—HP Compaq dx2200 Microtower Business PC, Mar. 1, 2007, Hewlett-Packard Development Company, L.P., DA-12426.*
Foreign Communication From A Counterpart Application, PCT Application No. PCT/CN2013/080462, International Search Report dated Dec. 12, 2013, 6 pages.
(Continued)

*Primary Examiner* — Wing F Chan
*Assistant Examiner* — Billy H Ng
(74) *Attorney, Agent, or Firm* — Conley Rose, P.C.

(57) ABSTRACT

The present invention provides a rule set orchestration processing method and apparatus, and a cluster data system. The method includes: grouping, according to device information of each network device in a network, each network device, to obtain at least one network device group; selecting, for each network device group obtained after the grouping, at least one service rule matching the network device group, to form a rule set of the network device group; and sending a rule set of each network device group to each network device in the network device group separately. In the present invention, all network devices are grouped into at least one network device group according to device information, a matched rule is selected and sent for each network device group to form a rule set, so as to avoid repetitive processing and excessive processing on the rule set.

8 Claims, 7 Drawing Sheets

(56) References Cited

U.S. PATENT DOCUMENTS

| | | | |
|---|---|---|---|
| 2003/0107590 A1* | 6/2003 | Levillain | H04L 29/06027 715/736 |
| 2006/0182037 A1* | 8/2006 | Chen | H04L 12/4641 370/252 |
| 2009/0232055 A1 | 9/2009 | Zhao et al. | |
| 2010/0058329 A1* | 3/2010 | Durazzo | H04L 69/40 717/176 |
| 2010/0309907 A1* | 12/2010 | Proulx | H04L 41/0806 370/389 |
| 2011/0128911 A1 | 6/2011 | Shaheen | |
| 2012/0150868 A1* | 6/2012 | Maghoul | G06F 17/30864 707/746 |
| 2013/0007231 A1* | 1/2013 | Forssell | H04L 41/082 709/221 |
| 2013/0205014 A1 | 8/2013 | Muro et al. | |
| 2014/0222989 A1* | 8/2014 | Tanaka | H04L 41/20 709/224 |

FOREIGN PATENT DOCUMENTS

| | | |
|---|---|---|
| CN | 103152197 A | 6/2013 |
| WO | 2011145374 A1 | 11/2011 |

OTHER PUBLICATIONS

Foreign Communication From A Counterpart Application, PCT Application No. PCT/CN2013/080462, Written Opinion dated Dec. 12, 2013, 5 pages.

Vecchiola, C., et al., "Aneka: A Software Platform for .NET-based Cloud Computing," GRIDS-TR-2009-4, Jul. 26, 2009, 30 pages.

Philips, E., et al., "Group Orchestration in a Mobile Environment," Coordination Models and Languages, Jun. 14, 2012, pp. 181-195.

Foreign Communication From A Counterpart Application, European Application No. 13799477.8, Extended European Search Report dated Apr. 29, 2015, 6 pages.

Foreign Communication From A Counterpart Application, Chinese Application No. 201310062082.8, Chinese Office Action dated May 6, 2015, 7 pages.

* cited by examiner

RULE SET ORCHESTRATION PROCESSING METHOD AND APPARATUS, AND CLUSTER DATA SYSTEM

CROSS-REFERENCE TO RELATED APPLICATIONS

This application is a continuation of International Application No. PCT/CN2013/080462, filed on Jul. 31, 2013, which claims priority to Chinese Patent Application No. 201310062082.8, filed on Feb. 27, 2013, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the communication field, and in particular, to a rule set orchestration processing method and apparatus, and a cluster data system.

BACKGROUND

Currently, a network supports more and more application services, and for many cluster networks, such as a large-scale cross-regional corporation network, and a cluster data center, a plurality of network devices need to be deployed to support numerous and diversified services. A user controls a service by customizing a corresponding service rule for various services in a network device, such as a switcher, a router, or the onion router (TOR).

As service types continuously increase, service rules corresponding to various services also increase correspondingly. Each network device may bear a plurality of services, and a plurality of service rules is required, that is, a rule set is formed. In order to reduce a management cost of the user, and improve coordinated orchestration for rule sets of a plurality of network devices, in the prior art, generally orchestration processing is performed on the rule sets in the following manner: a management device sends service rules of all services that a cluster network can bear to each network device, and each network device performs orchestration processing on the rule sets and is responsible for execution; or, the management device performs orchestration processing such as parsing and compiling on the service rules of all the network devices, to form, after the orchestration processing, a rule set, which serves as a rule knowledge base to be then sent to each network device, and each network device queries the rule knowledge base to find a matching rule and execute the matched rule.

However, in the foregoing manner, what is received by each network device is all service rules or a rule knowledge base after orchestration processing, and each network device does not need to bear all services, and does not need all rules, so the foregoing rule set orchestration processing method has a problem of repetitive processing and excessive processing on a rule set.

SUMMARY

Embodiments of the present invention provide a rule set orchestration processing method and apparatus, and a cluster data system, which are used to reduce repetitive processing and excessive processing on a rule set in each network device in a network, thereby improving a coordinated orchestration capability of rule sets in the entire network.

In a first aspect, an embodiment of the present invention provides a rule set orchestration processing method, including: grouping, according to device information of each network device in a network, each network device, to obtain at least one network device group; selecting, for each network device group obtained after the grouping, at least one service rule matching the network device group, to form a rule set of the network device group, where the matched service rule is a service rule of all services customized on each network device in the network device group; and sending a rule set of each network device group to each network device in the network device group separately.

In a first possible implementation manner of the first aspect, before the sending a rule set of each network device group to each network device in the network device group separately, the method further includes: performing orchestration processing on the rule set of each network device group, so as to obtain a rule set that each network device in each network device group is capable of executing.

With reference to the first possible implementation manner of the first aspect, in a second possible implementation manner, before the performing orchestration processing on the rule set of each network device group, the method further includes: removing, through filtration, a duplicate rule in the rule set of each network device group, so as to obtain a duplicate-free rule set of each network device group; and the performing orchestration processing on the rule set of each network device group, so as to obtain a rule set that each network device in each network device group is capable of executing includes performing orchestration processing on the duplicate-free rule set of each network device group, so as to obtain a rule set that each network device in each network device group is capable of executing.

With reference to the first aspect, the first or second possible implementation manner of the first aspect, in a third possible implementation manner, the method further includes: receiving service rule update information sent by a first network device, where the service rule update information is used to indicate that a service rule of a first service customized for the first network device is updated; the service rule update information includes the updated service rule of the first service, where the first service is one or more services of services customized on the first network device; identifying all network devices, in the network, customized with the first service, and a network device group to which each network device customized with the first service belongs; updating a rule set of each identified network device group, so as to update a service rule, corresponding to the first service, in the rule set of each identified network device group to be the updated service rule of the first service, which is included in the service rule update information; and sending each updated rule set separately to each network device in a network device group to which the rule set belongs.

With reference to the first aspect, the first, second, or third possible implementation manner of the first aspect, in a fourth possible implementation manner, the grouping, according to device information of each network device in a network, each network device, to obtain at least one network device group specifically includes: grouping each network device according to a location of each network device, to obtain at least one network device group; or grouping each network device according to a service rule customized for each network device, to obtain at least one network device group.

In a second aspect, an embodiment of the present invention provides a rule set orchestration processing apparatus, including: a network device management module configured to group, according to device information of each network device in a network, each network device, to obtain at least one network device group; a rule set extraction module configured to select, for each network device group obtained after the grouping, at least one service rule matching the network device group, to form a rule set of the network device group, where the matched service rule is a service rule of all services customized on each network device in the network device group; and a sending module configured to send a rule set of each network device group to each network device in the network device group separately.

In a first possible implementation manner of the second aspect, the apparatus further includes: an orchestration processing module configured to perform, before the sending module sends a rule set of each network device group to each network device in the network device group, orchestration processing on a rule set of the network device group, so as to obtain a rule set that each network device in the network device group is capable of executing.

With reference to the first possible implementation manner of the second aspect, in a second possible implementation manner, the orchestration processing module further includes: a duplicate removing module configured to remove, through filtration, a duplicate rule in the rule set of each network device group, so as to obtain a duplicate-free rule set of each network device group, where the orchestration processing module is specifically configured to perform, before the sending module sends a rule set of each network device group to each network device in the network device group, orchestration processing on a duplicate-free rule set of the network device group, so as to obtain a rule set that each network device in the network device group is capable of executing.

With reference to the second aspect, the first or second possible implementation manner of the second aspect, in a third possible implementation manner, the apparatus further includes: a receiving module configured to receive service rule update information sent by a first network device, where the service rule update information is used to indicate that a service rule of a first service customized for the first network device is updated; the service rule update information includes the updated service rule of the first service, where the first service is one or more services of services customized on the network device; an identifying module configured to identify all network devices, in the network, customized with the first service, and a network device group to which each network device customized with the first service belongs; and an updating module configured to update a rule set of each identified network device group, so as to update a service rule, corresponding to the first service, in the rule set of each identified network device group to be the updated service rule of the first service, which is included in the service rule update information, where the sending module is configured to send each updated rule set separately to each network device in a network device group to which the rule set belongs.

With reference to the second aspect, the first, second, or third possible implementation manner of the second aspect, in a fourth possible implementation manner, the network device management module is specifically configured to: group each network device according to a location of each network device, to obtain at least one network device group; or group each network device according to a service rule customized for each network device, to obtain at least one network device group.

In a third aspect, an embodiment of the present invention provides a cluster data system, including a plurality of network devices, a management device managing the plurality of network devices, and the rule set orchestration processing apparatus provided in any embodiment of the present invention, where the rule set orchestration processing apparatus is configured in the management device or configured independently.

In a first possible implementation manner of the third aspect, the rule set orchestration processing apparatus is configured on a single-core device or configured on a multi-core device.

In the rule set orchestration processing method and apparatus, and the cluster data system provided in the embodiments of the present invention, all network devices are grouped into at least one network device group according to device information, a matched rule is selected for each network device group to form a rule set and the rule set is sent to each network device in the network device group, so that each network device receives only a service rule corresponding to a service customized for each network device, so as to avoid repetitive processing and excessive processing on the rule set, thereby improving the coordinated orchestration capability of rule sets in the entire network.

BRIEF DESCRIPTION OF THE DRAWINGS

To illustrate the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
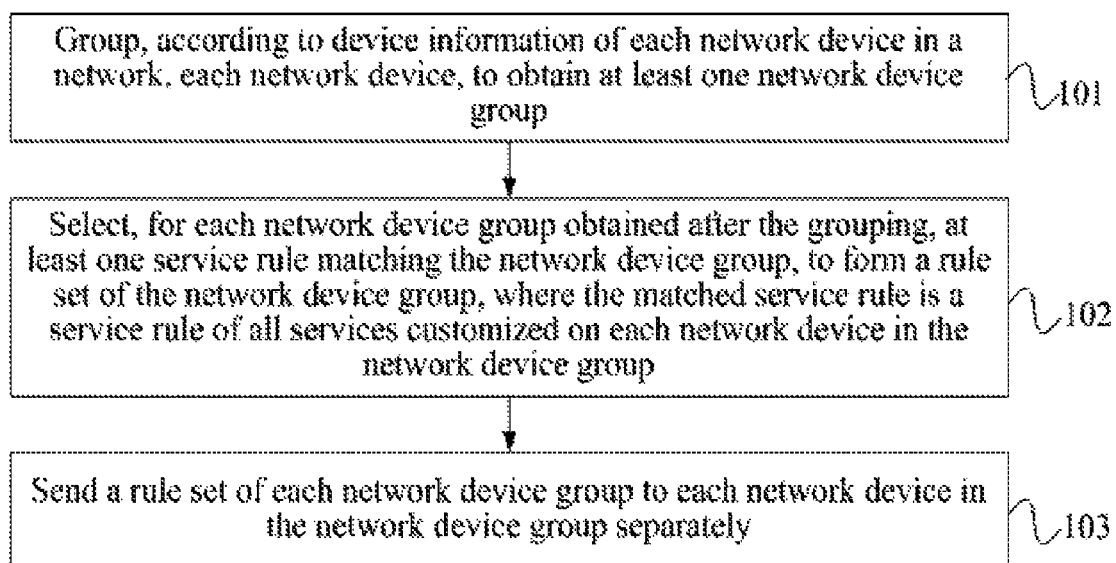
FIG. 1 is a flow chart of Embodiment 1 of a rule set orchestration processing method according to the present invention.

FIG. 1 is a flow chart of Embodiment 1 of a rule set orchestration processing method according to the present invention. This embodiment is applicable to a scenario of initializing each network device in a cluster network, the method may be executed by a rule set orchestration processing apparatus, and the apparatus may be set in a management device or may also be set independently. The method of this embodiment specifically includes the following steps.

Step 101: Group, according to device information of each network device in a network, each network device, to obtain at least one network device group.

Device information of a network device includes location information and customized service information of the network device, and generally, in a cluster network, service rules customized for network devices at a same location are the same. The rule set orchestration processing apparatus uniformly manages all network devices in the cluster network, and groups each network device according to the device information of each network device, such as location information, to obtain at least one network device group; or, groups each network device according to a service rule customized for each network device, to obtain at least one network device group. Generally, network devices whose customized service rules are the same or mostly the same are classified into a same network device group.

Step 102: Select, for each network device group obtained after the grouping, at least one service rule matching the network device group, to form a rule set of the network device group, where the matched service rule is a service rule of all services customized on each network device in the network device group.

A service rule refers to that a network device under a certain condition executes an action corresponding to the condition, is a criterion for the network device to perform service control on a service that it bears, and may be executed by the network device only after an orchestration processing action such as parsing and compiling is performed. After each network device is grouped, the rule set orchestration processing apparatus selects at least one service rule matching the network device group from a rule database for each network device group according to device information of each network device group. The rule database may be configured in the management device, or set independently, or may also be configured in an independent network element where the rule set orchestration processing apparatus is located. In the foregoing procedure, a rule set is selected according to device information, for several network devices whose device information is the same, that is, network devices belonging to a same network device group, only a rule set corresponding to device information of the network device group is selected, and a matched service rule is a service rule of all services customized on each network device in the network device group, so as to avoid a problem that because a same rule set is customized for a plurality of network devices, other processing such as rule set selection needs to be performed on each network device, thereby causing repetitive processing on the rule set.

Step 103: Send a rule set of each network device group to each network device in the network device group separately.

The rule set orchestration processing apparatus sends the selected rule set of each network device group to each network device in each network device group corresponding to device information. In this step, a rule set received by each network device group is a service rule corresponding to all services customized on each network device in the network device group, and each network device in each network device group does not need to receive service rules corresponding to all network devices in the entire cluster network, so as to avoid the problem of excessive processing on the rule set.

In the technical solution of this embodiment, all network devices are grouped according to device information, a corresponding rule is selected for each network device group to form a rule set and the rule set is sent to each network device in the network device group, so that each network device receives only a service rule corresponding to a service customized for each network device, so as to avoid the problem of repetitive processing and excessive processing on the rule set.

In the foregoing technical solution, the rule set orchestration processing apparatus may send each selected rule set to each network device group, and each network device in the network device group performs orchestration processing on and then executes the received rule set, or may also only perform orchestration processing on each selected rule set once, that is, the rule set orchestration processing apparatus may also perform orchestration processing on the selected rule set and then send the rule set to each network device. That is to say, in the foregoing technical solution, before sending each rule set to each network device in each corresponding network device group, the rule set orchestration processing apparatus may further perform orchestration processing on a rule set of each network device group, so as to obtain an orchestrated executable rule set, and then send the rule set subject to orchestration processing to each network device in the network device group, and each network device is only responsible for execution.

Additionally, under some situations, at least two service rules having a same execution condition and execution action may need to be customized for a same network device, that is, rule duplication; or, service rules whose conditions are repetitive are customized for a same network device, that is, at least two service rules of customized service rules are service rules whose execution conditions are the same but whose execution actions are different, such as, two service rules whose execution condition is: "domain name=www.heike.com", and whose execution actions are "add to a black list" and "discard" separately, and specifically, an action execution sequence is decided by a priority of a corresponding service. At this time, in order to avoid a situation of repetitively processing service rules, in a rule set of the network device group, which are repetitive or whose conditions are repetitive, before each rule set is sent to each network device group, duplicate removal orchestration processing may be performed on a rule set of each network device group, so as to obtain an orchestrated rule set. The duplicate removal orchestration processing regards a plurality of rules which are repetitive or whose conditions are repetitive as one service rule, and performs orchestration processing thereon only once.

Figure 2:
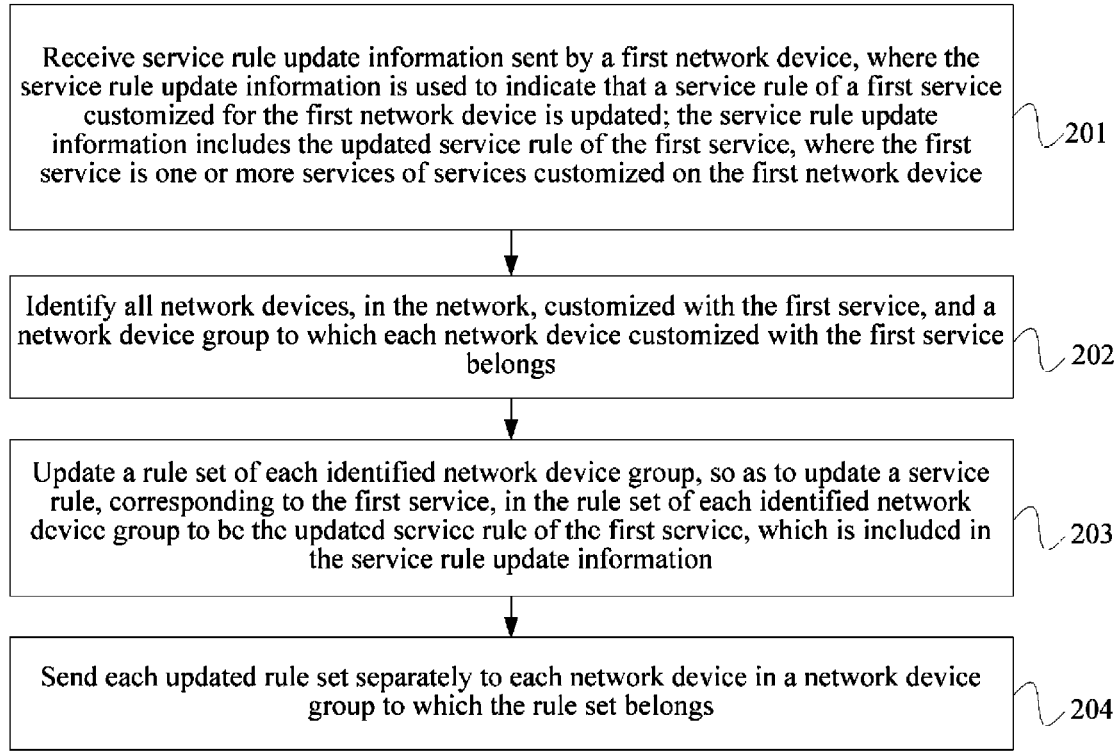
FIG. 2 is a flow chart of Embodiment 2 of a rule set orchestration processing method according to the present invention.

FIG. 2 is a flow chart of Embodiment 2 of a rule set orchestration processing method according to the present invention. This embodiment is applicable to a scenario where a service rule in a cluster data system needs to be updated, and the method may be executed by a rule set orchestration processing apparatus, and specifically includes the following steps.

Step 201: Receive service rule update information sent by a first network device, where the service rule update information is used to indicate that a service rule of a first service customized for the first network device is updated; the service rule update information includes the updated service rule of the first service, where the first service is one or more services of services customized on the first network device.

After a certain network device in a cluster network, that is, a first network device, updates a service rule of a first service customized for the first network device, the first network device sends service rule update information to the rule set orchestration processing apparatus, the service rule update information carries the updated service rule of the first service, and the first service may be one or more services of services customized for the first network device. In this step, the service rule update information may be initiated by a certain network device; however, the present invention is not limited thereto. In other possible implementation manners, the service rule update information may also be directly initiated by an administrator to the rule set orchestration processing apparatus, or initiated through a management device.

It should be noted that, the first network device in this embodiment refers to a network device through which an administrator performs service rule updating on a certain network device in the entire cluster network or cluster system due to reasons such as service demands, and is not specifically limited to a certain network device.

Step 202: Identify all network devices, in the network, customized with the first service, and a network device group to which each network device customized with the first service belongs.

The rule set orchestration processing apparatus may identify all network devices customized with the first service according to the received service rule update information, that is, network devices customized with the updated service rule in the service rule update information except the first network device, and identify a network device group to which each network device customized with the first service belongs according to device information of the identified network devices.

Step 203: Update a rule set of each identified network device group, so as to update a service rule, corresponding to the first service, in the rule set of each identified network device group to be the updated service rule of the first service, which is included in the service rule update information.

In this step, the rule set orchestration processing apparatus updates the rule set of the identified network device group according to the service rule update information, thereby updating a service rule of the network device group to which the network device customized with the first service belongs to be the updated service rule of the first service.

Step 204: Send each updated rule set separately to each network device in a network device group to which the rule set belongs.

The rule set orchestration processing apparatus sends each updated rule set to each network device in the network device group to which the rule set belongs.

For example, in the foregoing embodiment, if the administrator optimizes an application delivery controller (ADC) service in the first network device of the cluster network, the first network device sends service rule update information indicating ADC optimization to the rule set orchestration processing apparatus, where the service rule update information further carries an updated ADC service rule. If the rule set orchestration processing apparatus identifies, according to the reported service rule update information, that a second network device, a third network device, and a fourth network device each bear an ADC service, and the second network device and the third network device have the same network device information, that is, the second network device and the third network device belong to a same network device group, rule sets to which the service rule update information for ADC optimization belongs are a second rule set of a network device group to which the second network device and the third network device belong, and a fourth rule set of a network device group to which the fourth network device belongs. The rule set orchestration processing apparatus updates the second rule set and sends the updated second rule set to the second network device and the third network device, and updates the fourth rule set and sends the updated fourth rule set to the fourth network device.

In the technical solution of this embodiment, the service rule update information is received, network devices customized with an updated service rule in the service rule update information are identified, a network device group to which these network devices belong is identified according to device information of the identified network devices, rule updating is performed on a rule set of each network device group and the updated rule set is sent to each network device in a corresponding network device group, so as to implement synchronous updating on the entire network where the service rule is updated, thereby improving the coordinated orchestration capability of rule sets in the entire network.

In the foregoing technical solution, the rule set orchestration processing apparatus updates a rule set and then sends the updated rule set to each network device in a corresponding network device group, and a network device performs orchestration processing on the updated rule set; however, the present invention is not limited thereto. In other feasible implementation manners, the rule set orchestration processing apparatus may also perform orchestration processing such as parsing and compiling on the updated rule set and then send the updated rule set to a corresponding network device, and the network device is only responsible for execution.

Additionally, the management device or the rule set orchestration processing apparatus may also directly initiate the service rule update information according to a preset policy or manual operation, update a service rule, identify a rule set to which the updated service rule belongs and send the rule set to a network device corresponding to a network device group or perform orchestration processing on the rule set and then send the rule set to a corresponding network device.

Figure 3:
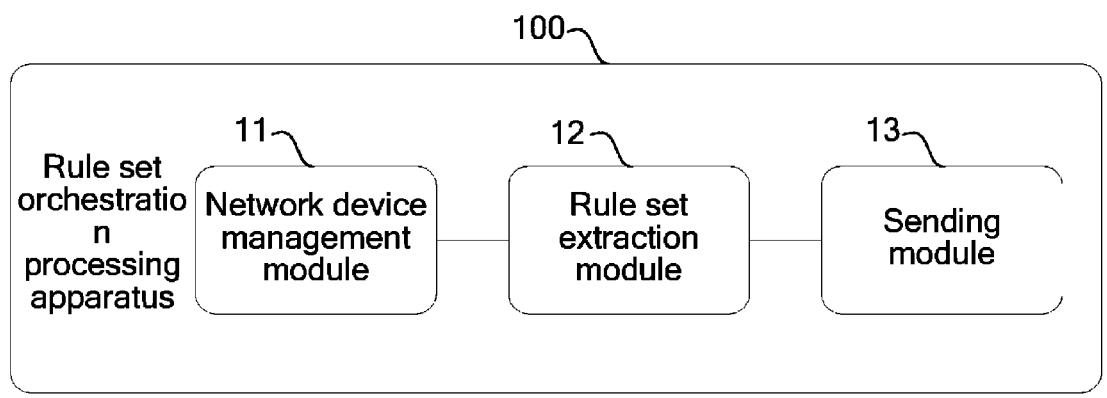
FIG. 3 is a schematic architectural diagram of Embodiment 1 of a rule set orchestration processing apparatus according to the present invention.

FIG. 3 is a schematic architectural diagram of Embodiment 1 of a rule set orchestration processing apparatus according to the present invention. As shown in FIG. 3, the rule set orchestration processing apparatus 100 of this embodiment may include: a network device management module 11 configured to group, according to device information of each network device in a network, each network device, to obtain at least one network device group; a rule set extraction module 12 configured to select, for each network device group obtained after the grouping, at least one service rule matching the network device group, to form a rule set of the network device group, where the matched service rule is a service rule of all services customized on each network device in the network device group; and a sending module

13 configured to send a rule set of each network device group to each network device in the network device group separately.

The apparatus of this embodiment may be configured to execute the technical solution of the method embodiment shown in FIG. 1. The network device management module groups all network devices into at least one network device group according to device information, the rule set extraction module selects a matched rule set for each network device group and the sending module sends the rule set to each network device in the network device group, so that each network device receives only a service rule corresponding to a service that each network device bears, so as to avoid repetitive processing and excessive processing on the rule set, thereby improving the coordinated orchestration capability of rule sets in the entire network.

Figure 4:
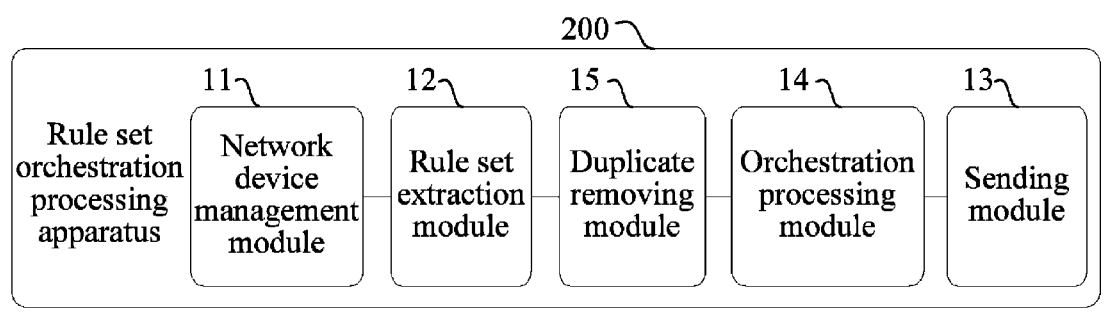
FIG. 4 is a schematic architectural diagram of Embodiment 2 of a rule set orchestration processing apparatus according to the present invention.

FIG. 4 is a schematic architectural diagram of Embodiment 2 of a rule set orchestration processing apparatus according to the present invention. As shown in FIG. 4, the apparatus of this embodiment is on the basis of the apparatus shown in FIG. 3, and the rule set orchestration processing apparatus 200 may further include: an orchestration processing module 14 configured to perform, before the sending module 13 sends a rule set of each network device group to each network device in the network device group, orchestration processing on a rule set of the network device group, so as to obtain a rule set that each network device in the network device group is capable of executing.

Further, referring to FIG. 4 again, the rule set orchestration processing apparatus 200 provided in the embodiment of the present invention further includes: a duplicate removing module 15 configured to remove, through filtration, a duplicate rule in the rule set of each network device group, so as to obtain a duplicate-free rule set of each network device group.

The orchestration processing module 14 is specifically configured to perform, before the sending module 13 sends a rule set of each network device group to each network device in the network device group, orchestration processing on a duplicate-free rule set of the network device group, so as to obtain a rule set that each network device in the network device group is capable of executing.

Figure 5:
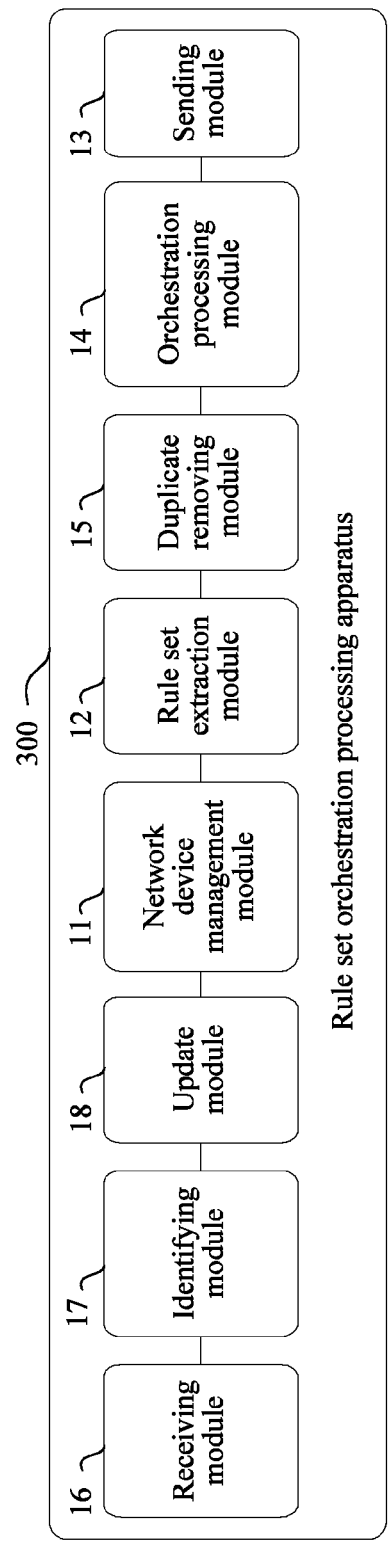
FIG. 5 is a schematic architectural diagram of Embodiment 3 of a rule set orchestration processing apparatus according to the present invention.

FIG. 5 is a schematic architectural diagram of Embodiment 3 of a rule set orchestration processing apparatus according to the present invention. As shown in FIG. 5, the apparatus of this embodiment is on the basis of the apparatus shown in FIG. 4, and the rule set orchestration processing apparatus 300 may further include: a receiving module 16 configured to receive service rule update information sent by a first network device, where the service rule update information is used to indicate that a service rule of a first service customized for the first network device is updated; the service rule update information includes the updated service rule of the first service, where the first service is one or more services of services customized on the network device; an identifying module 17 configured to identify all network devices, in the network, customized with the first service, and a network device group to which each network device customized with the first service belongs; an updating module 18 configured to update a rule set of each identified network device group, so as to update a service rule, corresponding to the first service, in the rule set of each identified network device group to be the updated service rule of the first service, which is included in the service rule update information; and a sending module 13 configured to send each updated rule set separately to each network device in a network device group to which the rule set belongs.

The apparatus of this embodiment may be configured to execute the technical solution of the method embodiment shown in FIG. 2. The receiving module receives service rule update information, the updating module identifies all rule sets to which an updated service rule in the service rule update information belong, and performs rule updating on these rule sets, and the sending module sends the updated rule sets to a corresponding network device, so as to implement synchronous updating on the entire network where the service rule is updated, thereby improving the coordinated orchestration capability of rule sets in the entire network.

Further, the network device management module 11 is specifically configured to: group each network device according to a location of each network device, to obtain at least one network device group; or group each network device according to a service rule customized for each network device, to obtain at least one network device group.

Figure 6:
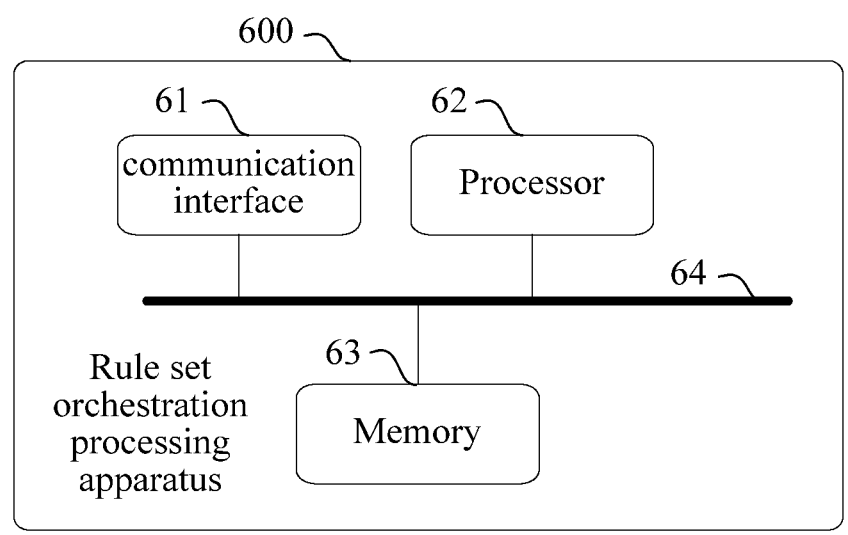
FIG. 6 is a schematic architectural diagram of Embodiment 4 of a rule set orchestration processing apparatus according to the present invention.

FIG. 6 is a schematic architectural diagram of Embodiment 4 of a rule set orchestration processing apparatus according to the present invention. As shown in FIG. 6, the rule set orchestration processing apparatus 600 of this embodiment includes: a communication interface 61, at least one processor 62, and a memory 63, and the processor 62, the memory 63, and the communication interface 61 are connected through a bus 64 to complete communication with each other. The bus 64 may be an industry standard architecture (ISA) bus, a peripheral component interconnect (PCI) bus, or an extended industry standard architecture (EISA) bus. The bus may be classified into an address bus, a data bus, a control bus, or the like. For convenience of denotation, only one thick line is used for denotation in FIG. 6, but it does not denote that there is only one bus or one type of bus. An instruction is stored in the memory 63, and when the rule set orchestration processing apparatus runs, the processor 62 and the memory 63 communicate with each other, and the processor 62 invokes an execution instruction in the memory 63, which is used to execute the following operations: grouping, according to device information of each network device in a network, each network device, to obtain at least one network device group; selecting, for each network device group obtained after the grouping, at least one service rule matching the network device group, to form a rule set of the network device group, where the matched service rule is a service rule of all services customized on each network device in the network device group; and sending a rule set of each network device group to each network device in the network device group through the communication interface 61 separately.

Optionally, before the sending a rule set of each network device group to each network device in the network device group separately, the operations further include: performing orchestration processing on the rule set of each network device group, so as to obtain a rule set that each network device in each network device group is capable of executing.

Optionally, before the performing orchestration processing on the rule set of each network device group, the operations further include: removing, through filtration, a duplicate rule in the rule set of each network device group, so as to obtain a duplicate-free rule set of each network device group; and the performing orchestration processing on the rule set of each network device group, so as to obtain a rule set that each network device in each network device group is capable of executing includes: performing orchestration processing on the duplicate-free rule set of each network device group, so as to obtain a rule set that each network device in each network device group is capable of executing.

Optionally, service rule update information sent by a first network device is received, where the service rule update information is used to indicate that a service rule of a first service customized for the first network device is updated; the service rule update information includes the updated service rule of the first service, where the first service is one or more services of services customized on the first network device; all network devices, in the network, customized with the first service, and a network device group to which each network device customized with the first service belongs are identified; a rule set of each identified network device group is updated, so as to update a service rule, corresponding to the first service, in the rule set of each identified network device group to be the updated service rule of the first service, which is included in the service rule update information; and each updated rule set is sent separately to each network device in a network device group to which the rule set belongs.

Optionally, the grouping, according to device information of each network device in a network, each network device, to obtain at least one network device group specifically includes: grouping each network device according to a location of each network device, to obtain at least one network device group; or grouping each network device according to a service rule customized for each network device, to obtain at least one network device group.

The apparatus of this embodiment is configured to execute the technical solution of the foregoing method embodiment, and an implementation principle and a technical effect of the apparatus are similar to those of the method, and are not described anymore here.

Based on the rule set orchestration processing method and apparatus, an embodiment of the present invention further provides a cluster data system, including a plurality of network devices, a management device, and a rule set orchestration processing apparatus. The rule set orchestration processing apparatus may be configured on the management device or configured independently. Several specific examples are used below for detailed illustration.

Figure 7:
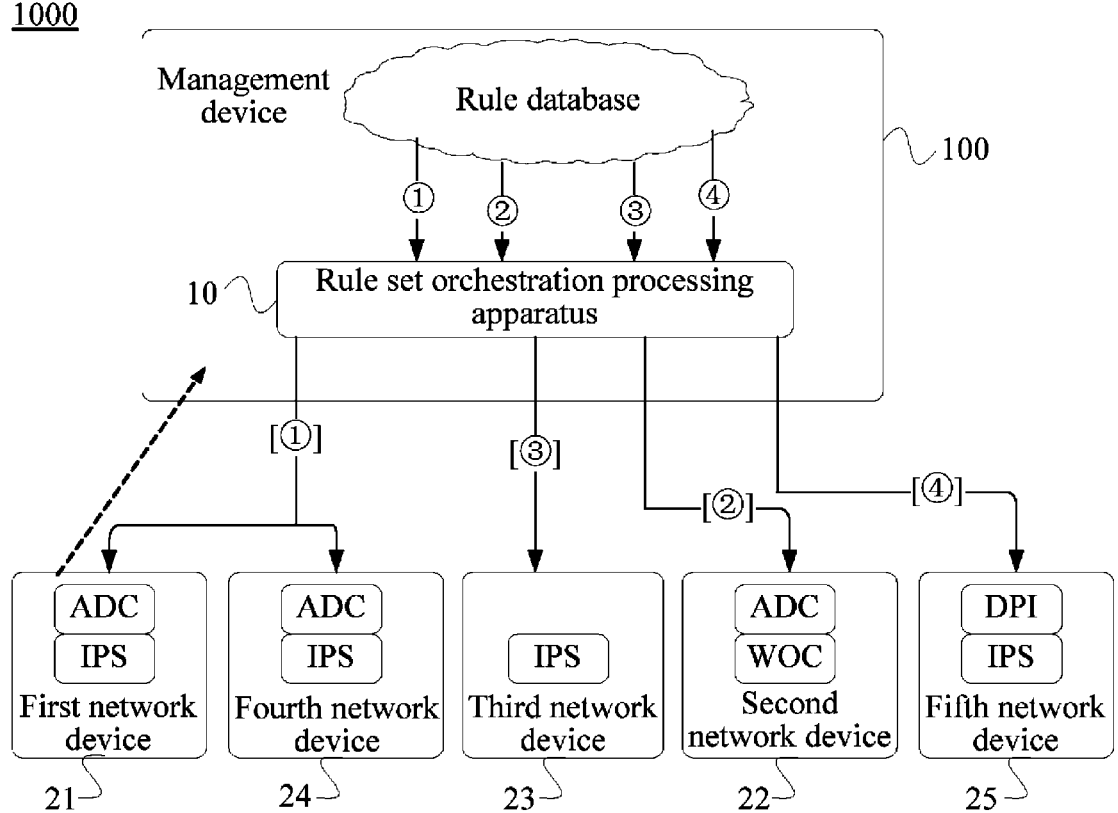
FIG. 7 is a schematic architectural diagram of Embodiment 1 of a cluster data system according to the present invention.

FIG. 7 is a schematic architectural diagram of Embodiment 1 of a cluster data system according to the present invention. As shown in FIG. 7, the cluster data system 1000 has a plurality of network devices, a management device 100, and a rule set orchestration processing apparatus 10 integrated on the management device 100. Five network devices are taken as an example for illustration in this embodiment, that is, a first network device 21, a second network device 22, a third network device 23, a fourth network device 24, and a fifth network device 25. In the cluster data system 1000, the management device 100 uniformly manages service rules of all the network devices to form a rule database, and may perform an action such as addition, deletion, or modification on a rule in the rule database; the rule set orchestration processing apparatus 10 groups all the network devices, and during system initialization, the rule set orchestration processing process is as follows:

1) A user customizes a rule.

As shown in FIG. 7, the cluster data system 1000 includes five network devices. For the first network device 21 and the fourth network device 24, an ADC service and an intrusion prevention system (IPS) service are customized; for the second network device 22, an ADC service and a wide area network optimization controller (WOC) are customized; for the third network device 23, only an IPS service is customized; and for the fifth network device 25, a deep packet inspection (DPI) service and an IPS service are customized.

2) The rule set orchestration processing apparatus groups the network devices.

The first network device 21 and the fourth network device 24 customize the same service rule, that is, rule sets thereof are the same, so the rule set orchestration processing apparatus groups the first network device 21 and the fourth network device 24 into one group, other network devices are each grouped into one group, and the network devices are classified into four types according to customized service information.

3) The rule set orchestration processing apparatus extracts a rule set.

The rule set orchestration processing apparatus extracts a rule for each network device group from the rule database according to the grouping result, and a plurality of extracted rules forms a rule set of the group of network devices. Specifically, service rule extraction is only performed on the first network device 21, the second network device 22, the third network device 23, and the fifth network device 25, as shown by (1) to (4) in the drawing. (1) represents a rule set formed for an ADC service and an IPS service extracted by a network device group to which the first network device 21 and the fourth network device 24 belong, (2) represents a rule set formed for an ADC service and a WOC service extracted by a network device group to which the second network device 22 belongs, (3) represents a rule set formed for an IPS service extracted by a network device group to which the third network device 23 belongs, and (4) represents a rule set formed for a DPI service and an IPS service extracted by a network device group to which the fifth network device 25 belongs.

4) The rule set orchestration processing apparatus performs orchestration processing on each rule set.

The rule set orchestration processing apparatus performs orchestration processing on different rule sets, to obtain rule sets subject to the orchestration processing. Specifically, as shown in FIG. 7, orchestration processing is performed on the rule set (1) to obtain an orchestrated rule set [(1)], orchestration processing is performed on the rule set (2) to obtain an orchestrated rule set [(2)], orchestration processing is performed on the rule set (3) to obtain an orchestrated rule set [(3)], and orchestration processing is performed on the rule set (4) to obtain an orchestrated rule set [(4)].

5) The rule set orchestration processing apparatus sends the rule set subject to the orchestration processing to each network device in a corresponding network device group.

The orchestrated rule set [(1)] is sent to the first network device 21 and the fourth network device 24, the orchestrated rule set [(2)] is sent to the second network device 22, the orchestrated rule set [(3)] is sent to the third network device 23, and the orchestrated rule set [(4)] is sent to the fifth network device 25.

Additionally, referring to FIG. 7 again, in the cluster data system, the first network device 21 updates a service rule of an ADC service, and at this time, a rule set of another network device bearing an ADC service in the cluster data system 1000 needs to be updated. Specifically, the rule set orchestration processing process during updating is as follows:

1) A network device reports service rule update information.

The first network device 21 updates an ADC service rule, and reports the service rule update information to the management device, as shown by a dashed line arrow in the drawing.

It should be noted that, in this embodiment, the present invention is described in detail by taking an example where the first network device 21 updates a service rule; however, the present invention is not limited thereto. In other feasible implementation manners, another network device may also update a service rule and report the service rule update information to the management device.

2) The rule set orchestration processing apparatus 10 updates and maintains a rule database.

The rule database includes service rules of all the network devices in the cluster data system 1000, and the rule set orchestration processing apparatus 10 updates a rule set bearing an ADC service according to device information, that is, updates the rule set corresponding to the first network device 21 and the second network device 22. The first network device 21 and the fourth network device 24 customize the same service, and have the same device information, so the rule set corresponding to the first network device 21 is further corresponding to the fourth network device 24 substantially.

3) The rule set orchestration processing apparatus 10 performs orchestration processing on the updated rule set.

For example, orchestration processing is performed on the updated rule set of the first network device 21 and the second network device 22.

4) The rule set orchestration processing apparatus 10 sends the rule set subject to the orchestration processing to a corresponding device.

The rule set orchestration processing apparatus 10 sends the rule set corresponding to the first network device 21 and subject to the orchestration processing to the first network device 21 and the fourth network device 24, and sends the rule set corresponding to the second network device 22 to the second network device 22.

It should be noted that, in the foregoing updating process, the management device 100 may also directly perform an action such as rule addition, deletion, or modification on the rule database, and the rule set orchestration processing apparatus 10 identifies a corresponding rule set according to the updated service rule and performs orchestration processing.

Figure 8:
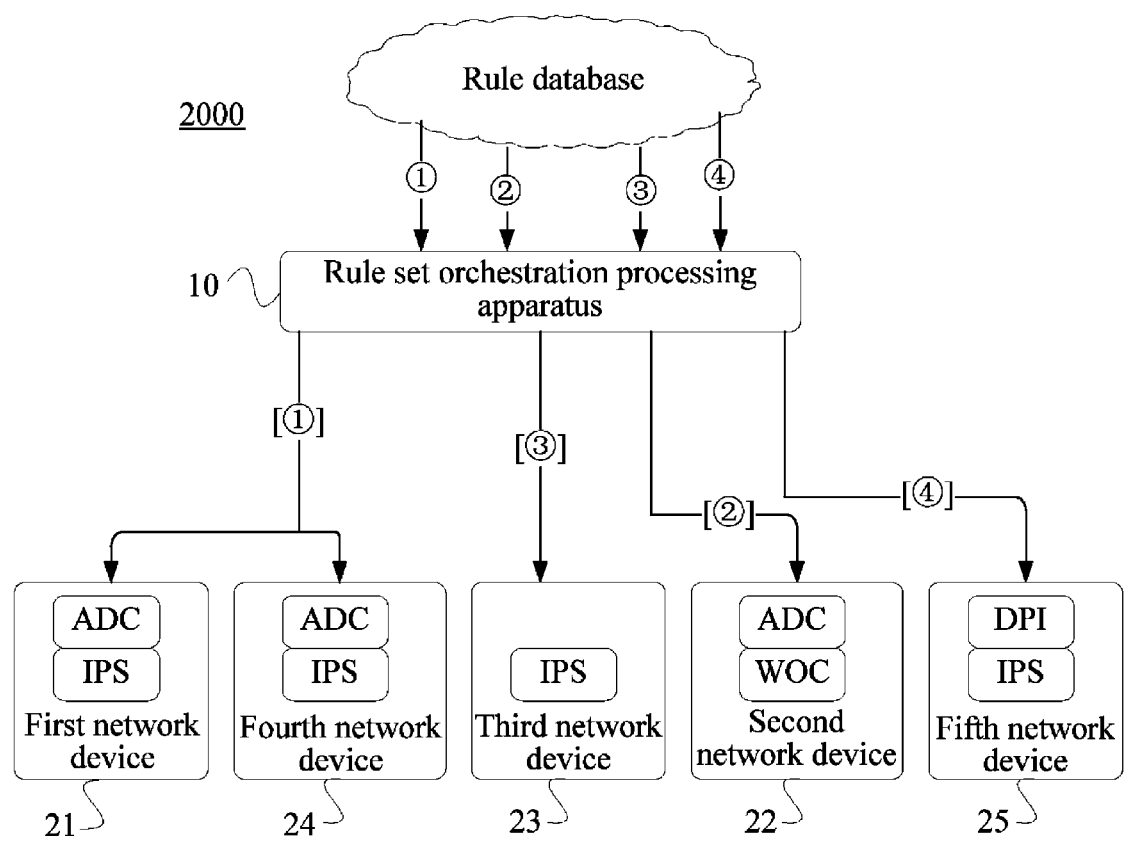
FIG. 8 is a schematic architectural diagram of Embodiment 2 of a cluster data system according to the present invention.

FIG. 8 is a schematic architectural diagram of Embodiment 2 of a cluster data system according to the present invention. As shown in FIG. 8, the cluster data system 2000 has a plurality of network devices, and a rule set orchestration processing apparatus 10 which is deployed independently.

The difference between this embodiment and the embodiment of FIG. 7 lies in that: in the embodiment of FIG. 7, the management device 100 may manage all service rules of the cluster data system 1000, and the rule set orchestration processing apparatus 10 is only responsible for network device grouping and rule set extraction, while in this embodiment, the rule set orchestration processing apparatus 10 may uniformly manage rule sets of all the network devices independently to form a rule database, add, delete, or modify a rule in the rule database, and group the network devices according to device information.

A working process and an implementation principle of the cluster data system in this embodiment are similar to those of the embodiment shown in FIG. 7. For details, reference may be made to the embodiment of FIG. 7, which is not described herein again.

The rule set orchestration processing apparatus may be configured on a single-core device, or may also be configured on a multi-core device. For example, in the embodiment shown in FIG. 7, the rule set processing orchestration apparatus may be integrated on the management device, and the management device is an ordinary single-core management device. In the foregoing embodiment of FIG. 8, the rule set processing orchestration apparatus is independently deployed; however, the orchestration processing process usually consumes time maximally, so in other implementation manners, the rule set processing orchestration apparatus may also be deployed on a multi-core management device or the rule set processing orchestration apparatus is directly deployed on a multi-core system, so as to enhance the orchestration capability of the rule set processing orchestration apparatus by using parallel processing performance of the multi-core system, thereby improving the orchestration efficiency.

The cluster data system provided in the embodiment of the present invention is not only applicable to various large-scale enterprise networks and data centers, but also applicable to another scenario where various devices are deployed in cluster, thereby controlling a service by customizing a rule for each device.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that he may still make modifications to the technical solutions described in the foregoing embodiments, or make equivalent replacements to some or all the technical features thereof, without departing from the spirit and scope of the technical solutions of the embodiments of the present invention.

What is claimed is:

1. A rule set orchestration processing method for initializing each network device in a network, the method comprising:

grouping, by a management device, according to device information of a plurality of network devices in the network, the plurality of network devices into at least two network device groups, wherein the plurality of network devices are grouped according to location information of each network device;

querying, by the management device, a rule database according to device information of each respective network device group of the at least two network device groups, to obtain a first rule set matching the respective network device group, wherein the first rule set comprises a service rule of all services customized on each network device in the respective network device group;

removing, through filtration, a duplicate rule in the first rule set of the respective network device group to obtain a duplicate-free rule set of the respective network device group;

performing orchestration processing on the duplicate-free rule set of the respective network device group to obtain a second rule set that each network device in the respective network device group is capable of executing; and sending, by the management device, the second rule set separately to each network device in the respective network device group.

2. The method according to claim 1, further comprising:
receiving service rule update information sent by a first network device, wherein the service rule update information is used to indicate that a first service rule of a first service customized for the first network device is updated, wherein the service rule update information comprises an updated first service rule of the first service, wherein the first service is one or more services of services customized on the first network device;
identifying all network devices in the network customized with the first service;
identifying a network device group to which each network device customized with the first service belongs;
updating the first rule set of each identified network device group; and
sending each updated first rule set separately to each network device in a network device group to which the updated first rule set belongs.

3. A rule set orchestration processing apparatus for initializing each network device in a network, comprising:
a processor; and
a non-transitory processor-readable memory,
wherein the processor and the memory are connected through a bus,
wherein the memory is configured to store an executable program code, and
wherein the processor is configured to read the executable program code stored in the memory so as to:
group, according to location information of a plurality of network devices in the network, the plurality of network devices into at least two network device groups;
query a rule database according to device information of each respective network device group of the at least two network device groups, to obtain a first rule set matching the respective network device group, wherein the first rule set comprises a service rule of all services customized on each network device in the respective network device group;
remove, through filtration, a duplicate rule in the first rule set of the respective network device group to obtain a duplicate-free rule set of the respective network device group;
perform orchestration processing on the duplicate-free rule set of the respective network device group to obtain a second rule set that each network device in the respective network device group is capable of executing; and
send the second rule set separately to each network device in the respective network device group.

4. The apparatus according to claim 3, wherein the processor is further configured to read the executable program code stored in the memory so as to:
receive service rule update information from a first network device using a communication interface, wherein the service rule update information is used to indicate that a first service rule of a first service customized for the first network device is updated, wherein the service rule update information comprises the updated first service rule of the first service, wherein the first service is one or more services of services customized on the first network device;
identify all network devices in the network customized with the first service;
identify a network device group to which each network device customized with the first service belongs;
update the first rule set of each identified network device group; and
send, by using the communication interface, each updated first rule set separately to each network device in a network device group to which the updated first rule set belongs.

5. A cluster data system, comprising:
a management device; and
a rule set orchestration processing apparatus comprising:
a processor; and
a non-transitory processor-readable memory,
wherein the processor and the memory are connected through a bus,
wherein the memory is configured to store an executable program code, and
wherein the processor is configured to read the executable program code stored in the memory so as to:
group, according to location information of a plurality of network devices in a network, the plurality of network devices into at least two network device groups;
query a rule database according to device information of each respective network device group of the at least two network device groups, to obtain a first rule set matching the respective network device group, wherein the first rule set comprises a service rule of all services customized on each network device in the respective network device group;
remove, through filtration, a duplicate rule in the first rule set of the respective network device group to obtain a duplicate-free rule set of the respective network device group;
perform orchestration processing on the duplicate-free rule set of the respective network device group to obtain a second rule set that each network device in the respective network device group is capable of executing; and
send the second rule set separately to each network device in the respective network device group.

6. The cluster data system according to claim 5, wherein the rule set orchestration processing apparatus is configured on a single-core device.

7. The cluster data system according to claim 5, wherein the rule set orchestration processing apparatus is configured on a multi-core device.

8. The cluster data system according to claim 5, wherein the rule set orchestration processing apparatus is integrated in the management device.

* * * * *